United States Patent
Kolesnikov (10) Patent No.: US 9,438,425 B2
(45) Date of Patent: Sep. 6, 2016

(54) ROBUST MAC AGGREGATION WITH SHORT MAC TAGS

(71) Applicant: Alcatel-Lucent USA Inc., Murray Hill, NJ (US)

(72) Inventor: Vladimir Kolesnikov, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 110 days.

(21) Appl. No.: 14/460,791

(22) Filed: Aug. 15, 2014

(65) Prior Publication Data

US 2016/0050073 A1    Feb. 18, 2016

(51) Int. Cl.
*H04L 9/32*    (2006.01)

(52) U.S. Cl.
CPC .................................. *H04L 9/3242* (2013.01)

(58) Field of Classification Search
CPC .................................................... H04L 9/3242
See application file for complete search history.

(56) References Cited

U.S. PATENT DOCUMENTS

| | | | | |
|---|---|---|---|---|
| 6,766,453 | B1 * | 7/2004 | Nessett | H04L 9/0844 455/410 |
| 7,725,719 | B2 * | 5/2010 | Sandberg | H04L 9/0637 713/170 |
| 8,190,894 | B2 * | 5/2012 | Sandberg | H04L 9/0637 713/170 |
| 8,341,417 | B1 * | 12/2012 | McGrew | G06F 21/64 713/181 |
| 8,996,871 | B2 * | 3/2015 | Sandberg | H04L 9/0637 713/170 |
| 2004/0123102 | A1 * | 6/2004 | Gehrmann | H04L 9/3242 713/161 |
| 2007/0106896 | A1 * | 5/2007 | Sandberg | H04L 9/0637 713/170 |
| 2007/0113083 | A1 * | 5/2007 | Volkovs | H04L 9/3242 713/168 |
| 2007/0294537 | A1 * | 12/2007 | Peyravian | H04L 9/3242 713/178 |
| 2008/0115194 | A1 * | 5/2008 | Apostolopoulos | H04L 9/3247 726/4 |
| 2010/0058070 | A1 * | 3/2010 | Garay | H04L 9/0631 713/190 |
| 2010/0205441 | A1 * | 8/2010 | Sandberg | H04L 9/0637 713/170 |
| 2010/0318804 | A1 * | 12/2010 | Volkovs | H04L 9/002 713/176 |
| 2011/0208965 | A1 * | 8/2011 | Machani | H04L 63/0435 713/168 |
| 2011/0238989 | A1 * | 9/2011 | Machani | H04L 9/0637 713/168 |
| 2012/0135776 | A1 * | 5/2012 | Chu | H04W 52/0238 455/522 |
| 2012/0179912 | A1 * | 7/2012 | Sandberg | H04L 9/0637 713/168 |
| 2012/0284523 | A1 * | 11/2012 | Kolesnikov | H04L 9/0643 713/181 |
| 2013/0145169 | A1 * | 6/2013 | Poovendran | H04L 9/3244 713/181 |
| 2014/0056306 | A1 | 2/2014 | Kolesnikov | |
| 2014/0237611 | A1 * | 8/2014 | Dent | G06F 21/64 726/26 |
| 2014/0310524 | A1 * | 10/2014 | Yamanaka | H04L 9/3242 713/170 |
| 2015/0288662 | A1 * | 10/2015 | Bilogrevic | H04L 65/403 713/168 |

* cited by examiner

*Primary Examiner* — Joseph P Hirl
*Assistant Examiner* — J. Brant Murphy
(74) *Attorney, Agent, or Firm* — Parker Justiss, PC (57) ABSTRACT

Method of producing an aggregated message authentication code (MAC). The method comprises generating or receiving, in a computer processor, a first message and its first MAC tag ($m_1$, $t_1$) and computing, in the computer processor, a first hashed message-tag pair $H(m_1, t_1)$, where H is a cryptographic hash function. The method comprises generating or receiving, in the computer processor, a second message and its second MAC tag ($m_2$, $t_2$) and computing, in the computer processor, a second hashed message-tag pair $H(m_2, t_2)$. The method comprises computing, in the computer processor, an aggregated MAC ($At_1$) by an addition operation, as follows: $At_1=(H(m_1, t_1)+H(m_2, t_2))$ modulo N, where N is a natural number equal to two or greater.

20 Claims, 4 Drawing Sheets

ROBUST MAC AGGREGATION WITH SHORT MAC TAGS

TECHNICAL FIELD OF THE INVENTION

The present invention is directed, in general, to data security and, more particularly, to a method and apparatus for aggregation of message authentication codes.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

A message authentication code (referred to herein as a MAC, MAC tag, or tag) is a digital signal sequence used for authenticating a message exchanged between a sender and receiver each having a shared secret "key". In a typical MAC authentication scenario, the sender of a message runs it through a cryptographic function (e.g., a function following the Advanced Encryption Standard) having the message and the secret key as inputs, yielding a MAC tag as an output. The sender then sends the message and the tag to the receiver. The receiver runs the received message through the same MAC algorithm using the same key, yielding a second MAC tag. The receiver then compares the tag generated by itself to the tag received from the sender and if they are the same, the message is deemed authentic. If they are not the same, it is an indication that the message was altered or compromised in some manner during the exchange. Often, the MAC can represent a significant information overhead, in some cases being larger in size (e.g., 128 bits) as compared to the size of the message that it authenticates (e.g., on the order of 10-15 bits).

SUMMARY OF THE INVENTION

One embodiment is a method of producing an aggregated message authentication code (MAC). The method comprises generating or receiving, in a computer processor, a first message and its first MAC tag $(m_1, t_1)$ and computing, in the computer processor, a first hashed message-tag pair $H(m_1, t_1)$, where H is a cryptographic hash function. The method comprises generating or receiving, in the computer processor, a second message and its second MAC tag $(m_2, t_2)$ and computing, in the computer processor, a second hashed message-tag pair $H(m_2, t_2)$. The method comprises computing, in the computer processor, an aggregated MAC $(At_1)$ by an addition operation, as follows: $At_1 = (H(m_1, t_1) + H(m_2, t_2))$ modulo N, where N is a natural number equal to two or greater.

Some embodiments can include further aggregating the aggregated MAC with third hashed message-tag pair, wherein: the computer processor generates or receives a third hashed message-tag pair $H(m_3, t_3)$, and the computer processor computes a further aggregated MAC $(At_2)$ by the addition operation, as follows: $At_2 = (H(m_3, t_3) + At_1)$ modulo N. Some such embodiments can include aggregating the further aggregated MAC with a plurality of m additional hashed message-tag pairs $H(m_m, t_m)$, wherein m is a natural number of four or greater and for each of the additional hashed message-tag pairs, a further n-th aggregated MAC $(At_n)$ is computed, by the computer processor, using the addition operation, as follows: $At_n = (H(m_m, t_m) + At_{n-1})$ modulo N, where $At_{n-1}$ equals a so-far aggregated MAC.

Some embodiments can further include aggregating the aggregated MAC $(At_1)$ with another aggregated MAC $(At_x)$ to form a combined aggregated MAC $(At')$, computed by the computer processor, using the addition operation, as follows: $At' = (At_1 + At_x)$ modulo N In any such embodiments, each of the MAC tags can be represented by a binary number have a bit length of 50 or less. In any such embodiments, H, the cryptographic hash function, can be a secure hash algorithm (SHA) function.

Some embodiments can further include verifying, in the computer processor or another computer processor, a candidate MAC. Verifying can include receiving a candidate aggregated MAC and a list of constituent messages associated with the candidate aggregated MAC. Verifying can include receiving a verification key. Verifying can include regenerating the candidate aggregated MAC, using the list of constituent messages and the verification key, to produce a verification aggregated MAC. Verifying can include comparing the candidate aggregated MAC to the verification aggregated MAC. In some such embodiments regenerating the candidate aggregated MAC can include computing the first hashed message-tag pair $H(m_1, t_1)$, where the second hashed message-tag pair $H(m_2, t_2)$ and the addition operation, where $(m_1)$ and $(m_2)$ are messages included in the list of constituent messages and tags associated with the candidate aggregated MAC.

In any such embodiments, the computer processor can be located in a communication sensor node of a communication network. In any such embodiments, the computer processor can be part of a computer communicably coupled to a database of records stored on a non-transitory computer readable medium.

Another embodiment is an apparatus for producing an aggregated message authentication code (MAC). The apparatus comprises a computer processor that can be programmed to generate or to receive a first message and its first MAC tag $(m_1, t_1)$, and a second message and its second MAC tag $(m_2, t_2)$. The computer processor can be programmed to compute a first hashed message-tag pair $H(m_1, t_1)$, and a second hashed message-tag pair $H(m_2, t_2)$ where H is a cryptographic hash function. The computer processor can be programmed to compute a first aggregated MAC $(At_1)$ by an addition operation, as follows: $At_1 = (H(m_1, t_1) + H(m_2, t_2))$ modulo N, where N is a natural number equal to two or greater.

In some embodiments, the computer processor can be programmed to further aggregate the aggregated MAC with a third hashed message-tag pair. In such embodiments, the computer processor can be programmed to generate or receive, a third hashed message-tag pair $H(m_3, t_3)$. In such embodiments, the computer processor can be programmed to compute a further aggregated MAC $(At_2)$ by the addition operation, as follows: $At_2 = (H(m_3, t_3) + At_1)$ modulo N.

In some embodiments, the computer processor is programmed to further aggregate the aggregated MAC $(At_1)$ with another aggregated MAC $(At_x)$ to form a combined aggregated MAC $(At')$, computed by the computer processor, using the addition operation, as follows: $At' = (At_1 + At_x)$ modulo N.

In any such embodiments, the computer processor can be located in the apparatus configured as one of a plurality of communication nodes of a communication network. In some such embodiments, the first message includes measurement data collected by a sensor of the one communication node, the sensor being connected to the computer processor. In some such embodiments, the apparatus, configured as one of the communication nodes, can further include: an input interface; an output interface; and a non-transitory computer readable medium, and wherein the computer processor is operably coupled to the input interface, the output interface and the memory.

In any such embodiments, the computer processor can be part of an apparatus configured as a computer device, the computer device being communicably coupled to a database of records stored on a non-transitory computer readable medium. In some such embodiments, the first message includes a copy of a first database record stored on the non-transitory computer readable medium located in the apparatus configured as a computer.

Another embodiment is a non-transitory computer readable medium, comprising computer-executable instructions stored on the computer readable medium. The instructions, when executed by the computer processor, perform a method that can include computing the aggregated MAC by any of the addition operations described above.

In some such embodiments, the computer readable medium includes further computer-executable instructions that, when executed by the computer processor, perform the above-described addition operation to compute the further aggregated MAC. In some embodiments, the computer readable medium includes further computer-executable instructions that, when executed by the computer processor, perform the above-described addition operation to compute the combined aggregated MAC.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

In the Figures and text, unless otherwise indicated, similar or like reference symbols indicate elements with similar or the same functions and/or structures.

In the Figures, unless otherwise indicated, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term "or," as used herein, refers to a non-exclusive or, unless otherwise indicated. Also, the various embodiments described herein are not necessarily mutually exclusive, as some embodiments can be combined with one or more other embodiments to form new embodiments.

Embodiments as further disclosed herein can facilitate the use of short MAC tags, thereby reducing data overhead. A cryptographic hash of a message and its corresponding tag is computed to form a hashed message-tag pair. As a result of such hashing, the tag information is distributed throughout the hashed message-tag pair. When the message-tag pair is added to another message-tag pair to form an aggregated MAC, the security of the aggregated MAC is additive. For instance, an adversary attempting to alter or forge the aggregated MAC would have to correctly guess the first tag and the second tag. Consequently, as additional message-tag pairs are added to the aggregated MAC, the difficulty of forging the aggregated MAC progressively (e.g., exponentially) increases.

As a non-limiting example, consider an embodiment where the tags for a first message-tag pair and for a second message-tag pair are each one bit in length. The probability of an adversary correctly guessing an individual tag's identity is 50 percent. If, however, the hashed first and second message-tag pairs are added together to form the aggregated MAC, then the probability that the adversary can correctly guess the aggregated MAC is 25 percent. By extension, if 100 such message-tag pairs, each having a tag one bit in length, were to be added together to form an aggregated MAC in this manner, then the probability of an adversary correctly forging each message and the aggregated MAC identity is only about $2^{(-100)}$.

This is in contrast to alternate approaches where, e.g., the tag of the first message-tag pair and the tag of the second message-tag pair are aggregated via an XOR (exclusive or) operation. In such a scenario, the probability that the adversary can correctly guess the aggregated MAC is still 50 percent because the aggregated MAC is still one bit in length. By extension, if 100 such message-tag pairs, each having a tag one bit in length, were to be aggregated via an XOR operation, then the probability of an adversary correctly guessing the aggregated tag's identity is still 50 percent.

It is counterintuitive that the security of an aggregated MAC formed by the above-described procedure can be improved, because hashing a message and tag does not in itself improve security against alteration and forgery. In some cases hashing may decrease security because after applying a hash function several different tags could be mapped onto the same value. This in turn could reduce the number of mistakes the adversary would make before correctly guessing the tags identities.

Figure 1:
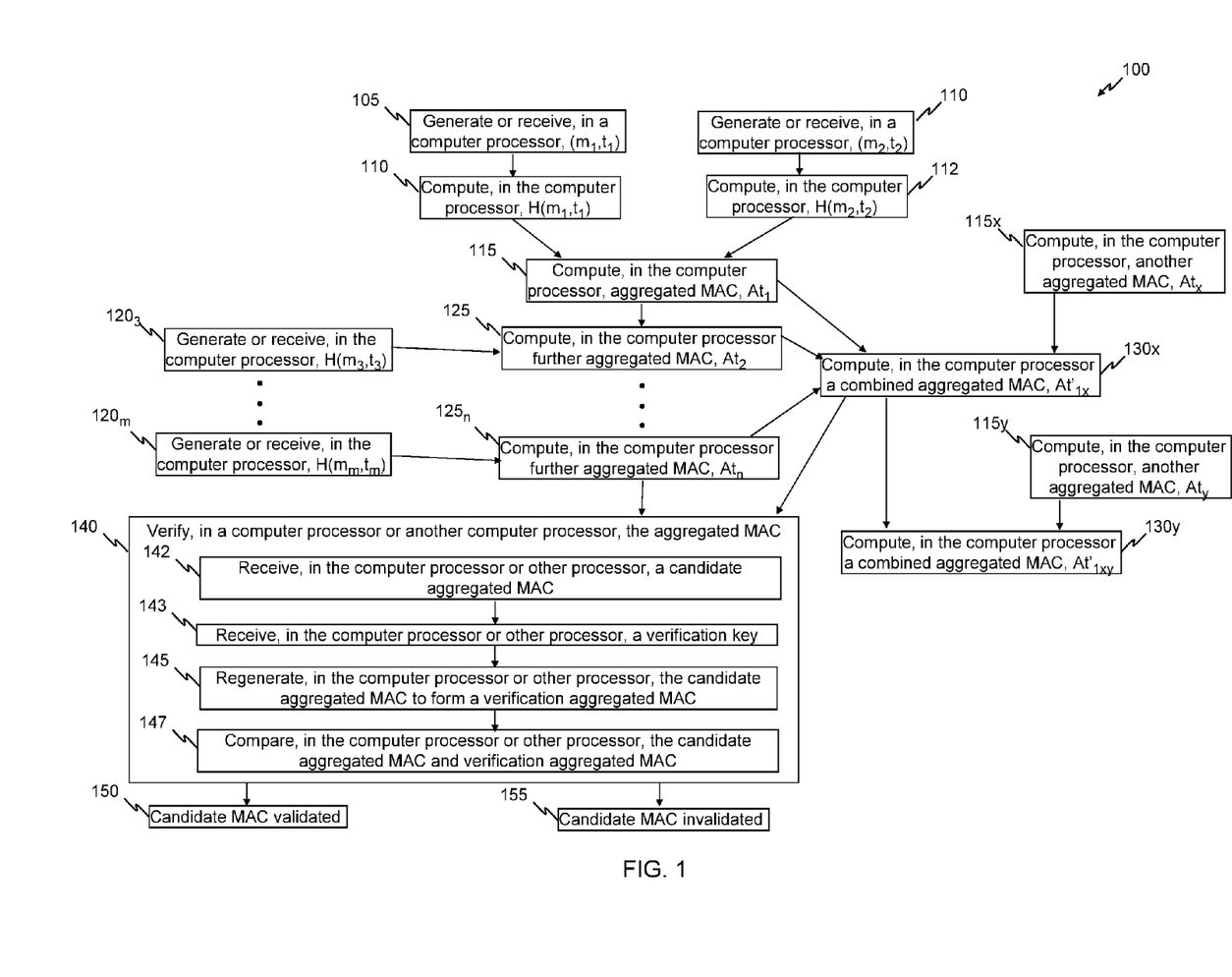
FIG. 1 presents an flowchart illustrating selected steps in an example method of aggregating a message authentication code in accordance with the present disclosure.
Figure 2:
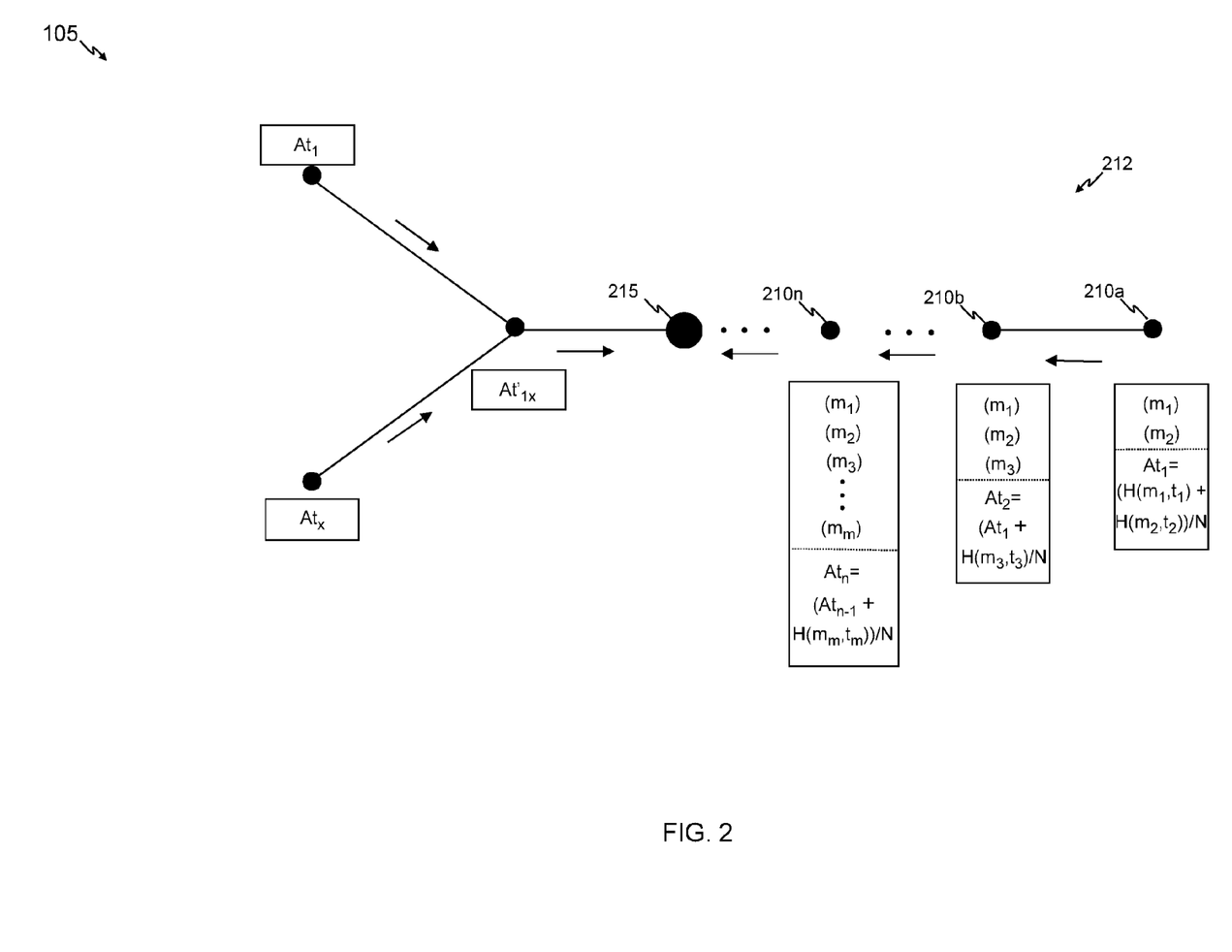
FIG. 2 illustrates example messages, tags and aggregated message authentication codes processed in accordance with method embodiments of the disclosure, such as any of the method embodiments discussed in the context of FIG. 1.

One embodiment is a method of producing an aggregated MAC. FIG. 1 presents a flowchart illustrating selected steps in an example method 100 of aggregating a MAC in accordance with the present disclosure. FIG. 2 illustrates example messages, tags and aggregated MACs processed in accordance with method embodiments of the disclosure, such as any of the method embodiments discussed in the context of FIG. 1.

With continuing reference to FIGS. 1 and 2 throughout, the method 100 comprises a step 105 of generating or receiving, in a computer processor, a first message and its first MAC tag ($m_1$, $t_1$), and, a step 107 of computing, in the computer processor, a first hashed message-tag pair $H(m_1, t_1)$, where H is a cryptographic hash function. One of ordinary skill in the pertinent art would understand how a computer processor could be programmed to execute instructions to run the first message and its first tag through a cryptographic hash function to produce the first hashed message-tag pair $H(m_1, t_1)$. One of ordinary skill in the pertinent art would understand how constituent messages and tags ($m_1$, $t_1$) could be generated or received by an electrical device such as a computer or sensor node, such as further discussed herein.

Non-limiting example cryptographic hash function include secure hash algorithm (SHA), such as the second (SHA2) and third generation (SHA3) sets of function, such as published by the National Institute of Standards and Technology. As an example, in some embodiments of the method 100, H is the SHA2-256 secure hash algorithm function.

As illustrated in FIGS. 1 and 2, the method 100 also comprises a step 110 of generating or receiving, in a computer processor, a second message and its second MAC tag ($m_2$, $t_2$), and a step 112 of computing, in the computer processor, a second hashed message-tag pair $H(m_2, t_2)$. In some embodiments, the same cryptographic hash function (e.g., H1=SHA2-256) can be used to produce the first and second hashed message-tag pairs, although in other embodiments different cryptographic hash functions (e.g., H1=SHA2-256 and H2=SHA2-512) could be used, e.g., to improve security.

Of particular importance are embodiments where tags are pre-generated and received and then stored by an electrical device as part of step 105, or, in analogous steps discussed herein such as step 110. It is desirable in such embodiments for the tags to be short so as to minimize the amount of device storage occupied by the tags.

The method also comprises a step 115 of computing, in the computer processor, a first aggregated MAC ($At_1$) by an addition operation, as follows:

$$At_1=(H(m_1,t_1)+H(m_2,t_2)) \text{modulo } N,$$

where N is a natural number equal to two or greater.

As indicated above, $At_1$ is equal to the modulo of the sum of the first and second hashed message-tag pairs. The size of the value of N is selected to put an upper boundary on the size of the aggregated MAC. For example, if N is 128, 50, 30 or 10 bits, then the aggregated MAC is 128, 50, 30 or 10 bits, respectively.

Embodiments of the method 100 can further include aggregating the aggregated MAC with a third or additional hashed message-tag pairs.

For example, as illustrated in FIG. 1 the method 100 can include a step of generating or receiving (e.g., step 120₃), in the computer processor, a third hashed message-tag pair $H(m_3, t_3)$. The third hashed message-tag pair can be generated in the computer processor or another computer processor by steps analogous to steps 105, 107 or 110, 112 as discussed above. The method can further include a step 125 of computing, in the computer processor, a further aggregated MAC ($At_2$) by the addition operation, as follows:

$$At_2=(H(m_3,t_3)+At_1) \text{modulo } N$$

$At_2$ is equal to the modulo of the sum of the third hashed message-tag pair and the previously or so-far aggregated MAC (e.g., the first aggregated MAC, $At_1$). Again N is a natural number equal to two or greater.

For example, as more generally, illustrated in FIG. 1, the method 100 can include a step 120m of generating or receiving, in the computer processor, m additional hashed message-tag pairs $H(m_m, t_m)$, where, e.g., m is a natural number of four or greater, and a step 125n of computing a further n-th aggregated MAC ($At_n$) by the computer processor. The further n-th aggregated MAC ($At_n$) is computed in step 125n using the addition operation, as follows:

$$At_n=(H(m_m,t_m)+At_{n-1}) \text{modulo } N,$$

where $At_{n-1}$ equals the previously or so-far aggregated MAC.

As illustrated in FIG. 1, embodiments of the method 100 can further include a step 130 (e.g., step 130x in FIG. 1) of aggregating the aggregated MAC (e.g., $At_1$) with another aggregated MAC (e.g., $At_x$ in FIG. 1) to form a combined aggregated MAC ($At'$, e.g., $At'_{1x}$). The other aggregated MAC ($At_x$) can be computed in a step 115x similar to the step 115 of computing the first aggregated MAC ($At_1$) as described above. The computer processor can compute in step 130 the combined aggregated MAC ($At'$, e.g., $At'_{1x}$) using the addition operation as follows:

$$At'=(At_1+At_x) \text{modulo } N,$$

where N is a natural number equal to two or greater.

Based on the present disclosure, one of ordinary skill would understand how still other aggregated MACs (e.g., $At_y$ in formed in step 115y in FIG. 1) could be combined with the combined aggregated MAC ($At_{1x}$) to form (e.g., step 130y) a further combined aggregated MACs (e.g., $At_{1xy}$).

As noted above adding hashed message-tag pairs to form an aggregated MAC is particularly useful for facilitating the secure use of short MAC tags, e.g., even a tag of one bit in length. For the purposes of the present disclosure, a short MAC tag is defined as being represented by a binary number having a bit length of 50 or less. In some embodiments the MAC tag can be represented by a binary number having a bit length of 10 or less. The disclosed method, however, can be also be used with longer MACs, e.g., MACs represented by a binary number have a bit length of 100, or 128.

As further illustrated in FIG. 1 embodiments of the method 100 can further include a step 140 of verifying, in the computer processor or another computer processor, the aggregated message authentication code. The verification step 140 includes a step 142 of receiving, in the computer processor or other computer processor, a candidate aggregated MAC (e.g., any MAC, which could include any of $At_1 \ldots At_n$ or $At_{1xy}'$, or, an imposter MAC) and the list of constituent messages (e.g., $m_1$, $m_2$, $m_3$, ... $m_m$ or other messages) associated with the candidate aggregated MAC.

The verification step 140 includes a step 143 of receiving, in the computer processor or other computer processor, a verification key. The verification key corresponds to a same secret key used as part of generating the MAC tags, e.g., the MAC tags in some embodiment generated, or, in other embodiments received, as part of steps 105 or 110.

The verification step 140 also includes a step 145 of regenerating, in the computer processor or other computer processor, the candidate aggregated MAC to form a verification aggregated MAC. Regenerating in step 145 includes executing steps 105 to 115, and in some cases, one or more of steps 125 and 130, based upon information provided in the list of constituent messages in the list associated with the candidate aggregated MAC.

The verification step 140 also includes a decision step 147 of comparing, in the computer processor or other computer processor, the candidate aggregated MAC to the verification aggregated MAC. If the candidate aggregated MAC is equal to the verification aggregated MAC, then the candidate aggregated MAC is authenticated as valid in step 150. If the candidate aggregated MAC is not equal to the verification aggregated MAC, then the candidate aggregated MAC is declared invalid in step 155.

In some embodiments, the disclosed method (e.g., method 100) can be used in the context of securely sending messages comprising data collected by a sensor node of a communication network, such a described in US Patent Publication 2014/0056306 to Kolesnikov, incorporated herein in its entirety. As a non-limiting example, the computer processor can be part of a sensor node (e.g., a mobile phone, power meter, thermostat control, or other electrical device equipped with one or more different types of sensors), the sensor being located at, or corresponding to, one node (e.g., node 210*a*) of a sensor node array 212 that collects data (e.g., local data, such as location, temperature, electricity consumption), in some cases a binary number of a few bits in length (e.g., about 10 to 15 bits). The sensor node 210*a* can be configured to transmit such data through the multi-node sensor mode array 212, in a hop-by-hop manner, to a control node 215. In some embodiments, the computer processor can generate the messages and corresponding MAC tags (e.g., $m_1$, $t_1$) that represent such local data measured in the vicinity of the node 210*a*. In some embodiments, the computer processor can receive messages and tags (e.g., $m_2$, $t_2$, and $m_3$, $t_3$) that were gathered by different nodes (e.g., nodes 210*b*, . . . , 210*n*) of the array 212. In some embodiments the computer processor can verify the authenticity of the received messages by verifying the candidate aggregated MAC received along with the messages, in accordance with step 140. The messages and tags can be hashed and the hashed message tag pairs aggregated such as described in the context of FIG. 1 to form the aggregated MACs before the messages and aggregated MACs are sent on to the next sensor node 210*a*, 210*b*, . . . 210*n* or control node 215.

In some embodiments, the disclosed method (e.g., method 100) can be used in the context of securely sending messages comprising records of data stored in a database. For example, the computer processor can be part of a computer communicably coupled to a database of records stored on a non-transitory computer readable medium of a server computer. As a non-limiting example, a telephone company server computer can have a database of call records (in some embodiments, each record being stored in a binary number of a few bits in length) and the database is stored on a non-transitory computer readable medium (e.g., a computer disk or similar media) of the server computer along with its corresponding MAC (e.g., m, t)). The server can be connected to a communication network (e.g., the internet) and subscribers to the telephone company can securely access their records from the database, along with the hashed message tag pairs and aggregated MACs, and verification steps such as described in the context of FIG. 1, via the network.

Figure 3:
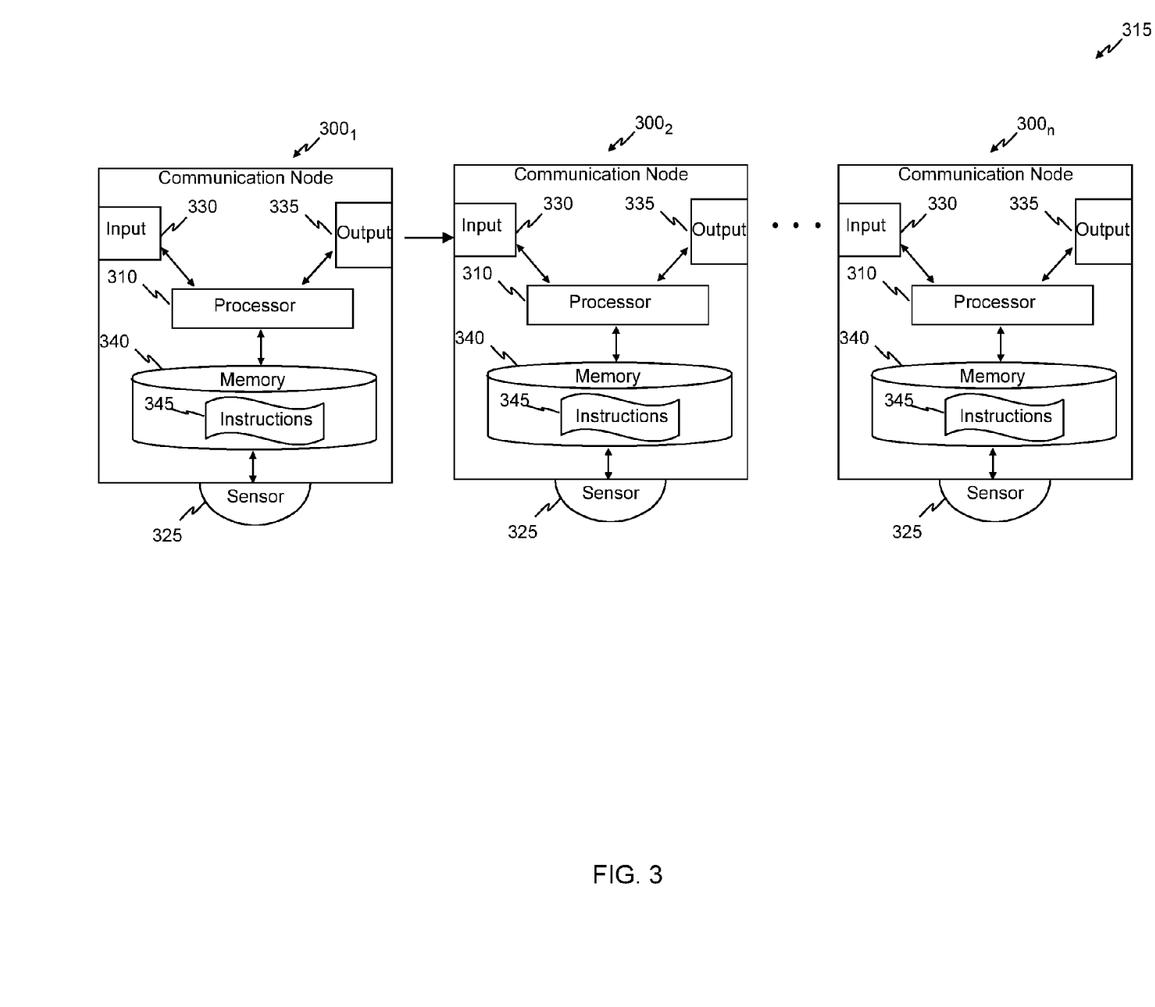
FIG. 3 presents a block diagram of an example apparatus of the disclosure.
Figure 4:
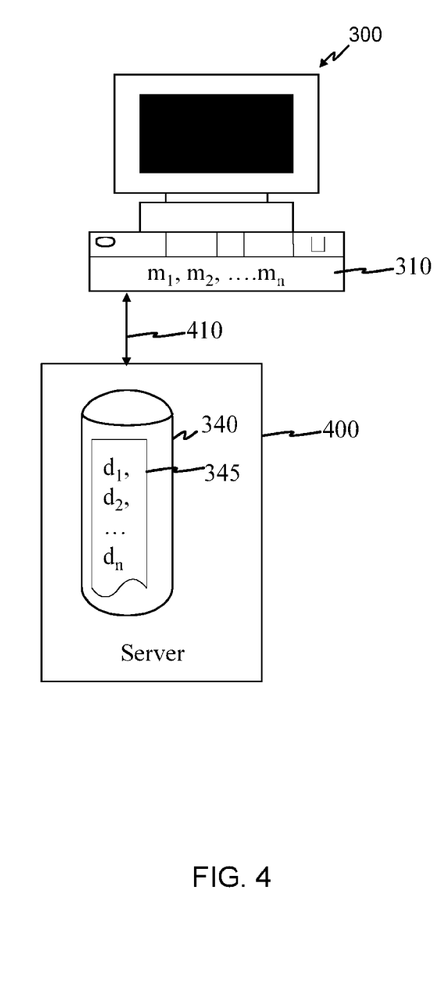
FIG. 4 presents a block diagram of another example apparatus of the disclosure.

Another embodiment is an apparatus. FIGS. 3 and 4 present block diagrams of two different example apparatuses 300 of the disclosure. The apparatus 300 has a computer processor 310. The computer processor 310 is programmed to execute a method of aggregating a message authentication code in accordance with the present disclosure, such as any of the method steps (e.g., method 100) discussed in the context of FIGS. 1 and 2.

For example, with continuing reference to FIGS. 1-4 throughout, the computer processor 310 is programmed to generate or to receive the first message and its first MAC tag ($m_1$, $t_1$), and the second message and its second MAC tag ($m_2$, $t_2$) (e.g., steps 105, 110). The computer processor 310 is programmed to compute the first hashed message-tag pair $H(m_1, t_1)$ and the second hashed message-tag pair $H(m_2, t_2)$ where H is the cryptographic hash function (e.g., steps 107, 112). The computer processor 310 is programmed to compute (e.g., step 115) a first aggregated MAC ($At_1$) by the addition operation, as follows: $At_1 = (H(m_1, t_1) + H(m_2, t_2))$ modulo N, where N is a natural number equal to two or greater.

For example, embodiments of the computer processor 310 can be further programmed to further aggregate (step 125) the aggregated MAC with a third hashed message-tag pair, wherein: the computer processor is programmed to generate or receive (step 120) the third hashed message-tag pair $H(m_3, t_3)$, and to compute the further aggregated MAC ($At_2$), by the addition operation (step 125) as follows: $At_2 = (H(m_3, t_3) + At_1)$ modulo N.

For example, embodiments of the computer processor 310 can be further programmed to further aggregate (step 130) the aggregated MAC ($At_1$) with another aggregated MAC ($At_x$) (e.g., formed in step 115) to form a combined aggregated MAC ($At'$), computed by the computer processor using the addition operation, as follows: $At' = (At_1 + At_x)$ modulo N.

As illustrated in FIG. 3, in some embodiments, the apparatus is configured as one (e.g., node $300_1$) of a plurality of communication nodes $300_1, \ldots, _n$ of a communication network 315. For instance, in this embodiment the first message may include measurement data collected by a sensor 325 (e.g., temperature, pressure, geolocation, electricity consumption or similar sensors) of the communication node $300_1$, the sensor 325 being connected to the computer processor 310 of the communication node $300_1$.

In some such embodiments, the apparatus, configured as one of the communication nodes $300_1$, can further includes, an input interface 330, an output interface 335, and non-transitory computer readable medium 340 (e.g., RAM, SRAM, DRAM or other non-transitory memory). The processor 310 is operably coupled to the input interface 330, the output interface 335 and the medium 340. One of ordinary skill in the pertinent art would understand how the processor 310 can be programmed to executing program code instruction 345 stored in the medium 340 to perform the method steps 105-150 discussed in the context of FIGS. 1 and 2.

As illustrated in FIG. 4, in some embodiments, the apparatus is configured as a computer device 300 and the computer processor 310 is part of the computer device 300. The computer device 300 can be any electronic device capable of carrying out a set of arithmetic or logical operations according to a programmed set of instructions. The computer device 300 is communicably coupled to a database of records 345 stored on a non-transitory computer readable medium 340. In some embodiments the non-transitory readable medium 340 can be stored in the computer device 300 itself. In some embodiments the non-transitory computer readable medium 340 is stored on a separate computer device 400 (e.g., a server computer device) and the computer processor 310 of the computer device 300 accesses the non-transitory readable medium 340 remotely connected via a communication network 410 (e.g., a connection via the internet).

For example, the messages (e.g., $m_1 \ldots m_m$) can include a copy of the database records 345 (e.g., records $d_1 \ldots d_n$, respectively) stored on the non-transitory computer readable medium 340 located in the apparatus configured as the computer 300.

FIGS. 3 and 4 also illustrate another embodiment of the disclosure, non-transitory computer readable medium 340. The medium comprises computer-executable instructions 350 stored on the computer readable medium 340. Embodiments of the computer-executable instructions 345 could include but are not limited to operating system firmware/software and application software. The instructions 345, when executed by the computer processor 310, perform a method (e.g., method 100) that includes computing, the first aggregated MAC by the addition operation (e.g., steps 105-115). Embodiments of the medium 340 could include instructions 345 to perform the addition operations of step 125 or step 130, or the verification step 140 as discussed herein.

Although the present disclosure has been described in detail, those skilled in the art should understand that they can make various changes, substitutions and alterations herein without departing from the scope of the invention.

What is claimed is:

1. A method of producing an aggregated message authentication code (MAC), comprising:
   generating or receiving, in a computer processor, a first message and its first MAC tag ($m_1$, $t_1$);
   computing, in the computer processor, a first hashed message-tag pair $H(m_1, t_1)$, where H is a cryptographic hash function;
   generating or receiving, in the computer processor, a second message and its second MAC tag ($m_2$, $t_2$);
   computing, in the computer processor, a second hashed message-tag pair $H(m_2, t_2)$;
   computing, in the computer processor, an aggregated MAC ($At_1$) by an addition operation, as follows:

$$At_1 = (H(m_1, t_1) + H(m_2, t_2)) \text{modulo } N,$$

where N is selected to equal a natural number equal to two or greater.

2. The method of claim 1, further including aggregating the aggregated MAC with a third hashed message-tag pair, wherein:
   the computer processor generates or receives, a third hashed message-tag pair $H(m_3, t_3)$; and
   the computer processor computes, a further aggregated MAC ($At_2$) by the addition operation, as follows:

$$At_2 = (H(m_3, t_3) + At_1) \text{modulo } N.$$

3. The method of claim 2, including aggregating the further aggregated MAC with a plurality of m additional hashed message-tag pairs $H(m_m, t_m)$, wherein m is a natural number of four or greater and for each of the additional hashed message-tag pairs, a further n-th aggregated MAC ($At_n$) is computed, by the computer processor, using the addition operation, as follows:

$$At_n = (H(m_m, t_m) + At_{n-1}) \text{modulo } N,$$

where $At_{n-1}$ equals a so-far aggregated MAC.

4. The method of claim 1, further including aggregating the aggregated MAC ($At_1$) with another aggregated MAC ($At_x$) to form a combined aggregated MAC (At'), computed by the computer processor, using the addition operation, as follows:

$$At' = (At_1 + At_x) \text{modulo } N.$$

5. The method of claim 1, wherein each of the MAC tags is represented by a binary number have a bit length of 50 or less.

6. The method of claim 1, wherein H, the cryptographic hash function, is a secure hash algorithm (SHA) function.

7. The method of claim 1, further including verifying, in the computer processor or another computer processor, a candidate MAC, including:
   receiving a candidate aggregated MAC and a list of constituent messages associated with the candidate aggregated MAC;
   receiving a verification key;
   regenerating the candidate aggregated MAC, using the list of constituent messages and the verification key, to produce a verification aggregated MAC; and
   comparing the candidate aggregated MAC to the verification aggregated MAC.

8. The method of claim 7, wherein regenerating the candidate aggregated MAC includes computing the first hashed message-tag pair $H(m_1, t_1)$, the second hashed message-tag pair $H(m_2, t_2)$ and the addition operation, where ($m_1$) and ($m_2$) are messages included in the list of constituent messages and tags associated with the candidate aggregated MAC.

9. The method of claim 1, wherein the computer processor is located in a communication sensor node of a communication network.

10. The method of claim 1, wherein the computer processor is part of a computer communicably coupled to a database of records stored on a non-transitory computer readable medium.

11. An apparatus for producing an aggregated message authentication code (MAC), comprising:
    a computer processor that is programmed to generate or to receive a first message and its first MAC tag ($m_1$, $t_1$), and a second message and its second MAC tag ($m_2$, $t_2$), wherein:
    the computer processor is programmed to compute a first hashed message-tag pair $H(m_1, t_1)$, and a second hashed message-tag pair $H(m_2, t_2)$ where H is a cryptographic hash function; and
    the computer processor is programmed to compute a first aggregated MAC ($At_1$) by an addition operation, as follows:

$$At_1 = (H(m_1, t_1) + H(m_2, t_2)) \text{modulo } N,$$

where N is a natural number selected to equal to two or greater.

12. The apparatus of claim 11, wherein the computer processor is programmed to further aggregate the aggregated MAC to a third hashed message-tag pair wherein:
    the computer processor is programmed to generate or receive, a third hashed message-tag pair $H(m_3, t_3)$;
    the computer processor is programmed to compute, a further aggregated MAC ($At_2$) by the addition operation, as follows:

$$At_2 = (H(m_3, t_3) + At_1) \text{modulo } N.$$

13. The apparatus of claim 11, wherein the computer processor is programmed to further aggregate the aggregated MAC ($At_1$) to another aggregated MAC ($At_x$) to form a combined aggregated MAC (At'), computed by the computer processor, using the addition operation, as follows:

$$At'=(At_1+At_x) \text{modulo } N.$$

14. The apparatus of claim 11, wherein the computer processor is located in the apparatus configured as one of a plurality of communication nodes of a communication network.

15. The apparatus of claim 14, wherein the first message includes measurement data collected by a sensor of the one communication node, the sensor connected to the computer processor.

16. The apparatus of claim 14, wherein the apparatus, configured as one of the communication node, further includes:
   an input interface;
   an output interface; and
   a non-transitory computer readable medium, wherein the computer processor is operably coupled to the input interface, the output interface and the memory.

17. The apparatus of claim 11, wherein the computer processor is part of an apparatus configured as a computer device, the computer device communicably coupled to a database of records stored on a non-transitory computer readable medium.

18. The apparatus of claim 17, wherein the first message includes a copy of a first database record stored on the non-transitory computer readable medium located in the apparatus configured as a computer.

19. A non-transitory computer readable medium, comprising:
   computer-executable instructions stored on the computer readable medium that, when executed by a computer processor, perform a method that includes computing an aggregated message authentication code (MAC), including:
   generating or receiving, in the computer processor, a first message and its first MAC tag ($m_1$, $t_1$)
   computing, in the computer processor, a first hashed message-tag pair $H(m_1, t_1)$, where H is a cryptographic hash function;
   generating or receiving, in the computer processor, a second message and its second MAC tag ($m_2$ $t_2$);
   computing, in the computer processor, a second hashed message-tag pair $H(m_2, t_2)$;
   computing, in the computer processor, an aggregated MAC ($At_1$) by an addition operation, as follows:

$$At_1=(H(m_1,t_1)+H(m_2,t_2)) \text{modulo } N,$$

where N is selected to equal a natural number equal to two or greater.

20. The computer readable medium recited in claim 19, wherein the computer readable medium includes further computer-executable instructions that, when executed by the computer processor, compute a further aggregated MAC, ($At_2$) including computing the addition operation, as follows:

$$At_2=(H(m_3,t_3)+At_1) \text{modulo } N$$

where $H(m_3, t_3)$ is a third hashed message-tag pair generated or received by the computer processor.

* * * * *